United States Patent
Vengallur et al.

(10) Patent No.: US 11,544,191 B2
(45) Date of Patent: Jan. 3, 2023

(54) EFFICIENT HARDWARE ARCHITECTURE FOR ACCELERATING GROUPED CONVOLUTIONS

(71) Applicant: Intel Corporation, Santa Clara, CA (US)

(72) Inventors: Ambili Vengallur, Bangalore (IN); Bharat Daga, Bangalore (IN); Pradeep K. Janedula, Bangalore (IN); Bijoy Pazhanimala, Bangalore (IN); Aravind Babu Srinivasan, Bangalore (IN)

(73) Assignee: INTEL CORPORATION, Santa Clara, CA (US)

(*) Notice: Subject to any disclaimer, the term of this patent is extended or adjusted under 35 U.S.C. 154(b) by 278 days.

(21) Appl. No.: 16/830,457

(22) Filed: Mar. 26, 2020

(65) Prior Publication Data

US 2020/0233803 A1 Jul. 23, 2020

(51) Int. Cl.
*G06F 12/0811* (2016.01)
*G06N 3/08* (2006.01)
*G06F 7/544* (2006.01)

(52) U.S. Cl.
CPC ........ *G06F 12/0811* (2013.01); *G06F 7/5443* (2013.01); *G06N 3/08* (2013.01); *G06F 2212/1016* (2013.01); *G06F 2212/45* (2013.01)

(58) Field of Classification Search
CPC ............... G06F 12/0811; G06F 7/5443; G06F 2212/1016; G06F 2212/45; G06N 3/08
See application file for complete search history.

(56) References Cited

U.S. PATENT DOCUMENTS

| | | | |
|---|---|---|---|
| 2017/0344882 A1* | 11/2017 | Ambrose | G06F 3/0604 |
| 2018/0046894 A1* | 2/2018 | Yao | G06F 7/483 |
| 2019/0066257 A1* | 2/2019 | Daga | H04N 19/436 |

(Continued)

FOREIGN PATENT DOCUMENTS

| | | |
|---|---|---|
| EP | 3885997 A1 | 9/2021 |
| TW | 202145019 A | 12/2021 |

OTHER PUBLICATIONS

European Patent Office, "Extended European Search Report," issued in connection with European Appl. No. 20207096.7, dated Jun. 24, 2021, 12 pages.

(Continued)

*Primary Examiner* — Zachary K Huson
(74) *Attorney, Agent, or Firm* — Hanley, Flight & Zimmerman, LLC

(57) ABSTRACT

Hardware accelerators for accelerated grouped convolution operations. A first buffer of a hardware accelerator may receive a first row of an input feature map (IFM) from a memory. A first group comprising a plurality of tiles may receive a first row of the IFM. A plurality of processing elements of the first group may compute a portion of a first row of an output feature map (OFM) based on the first row of the IFM and a kernel. A second buffer of the accelerator may receive a third row of the IFM from the memory. A second group comprising a plurality of tiles may receive the third row of the IFM. A plurality of processing elements of the second group may compute a portion of a third row of the OFM based on the third row of the IFM and the kernel as part of a grouped convolution operation.

20 Claims, 9 Drawing Sheets

(56) References Cited

U.S. PATENT DOCUMENTS

2019/0102671 A1* 4/2019 Cohen .................... G06F 16/17
2019/0370631 A1* 12/2019 Fais ........................ G06F 8/31

OTHER PUBLICATIONS

Hai Wang et al., "Enhanced Efficiency 3D Convolution Based on Optimal FPGA Accelerator," IEEE Access, vol. 5, pp. 6909-6916, dated Jun. 7, 2017, 8 pages.

Haobo Xu et al., "ACG-Engine: An Interface Accelerator for Content Generative Neural Networks," 2019 IEEE/ACM International Conference on Computer-Aided Design (ICCAD), IEEE, dated Nov. 4, 2019, 7 pages.

Yuran Qiao et al., "FPGA-accelerated deep convolutional neural networks for high throughput and energy efficiency," Concurrency and Computation: Practice and Experience, Wiley Online Library, dated May 6, 2016, 20 pages.

Zhiqiang Liu et al., "Throughput-Optimized FPGA Accelerator for Deep Convolutional Neural Networks," ACM Transactions on Reconfigurable Technology and Systems, vol. 10, No. 3, dated Jul. 19, 2017, 12 pages.

\* cited by examiner

EFFICIENT HARDWARE ARCHITECTURE FOR ACCELERATING GROUPED CONVOLUTIONS

BACKGROUND

Deep neural networks (DNNs) are tools for solving complex problems across a wide range of domains such as computer vision, image recognition, speech processing, natural language processing, language translation, and autonomous vehicles. One example of a DNN is a convolutional neural network (CNN). Many attempts have been made to reduce the computational cost of deep learning workloads. One such example is grouped convolution operations. However, grouped convolution operations do not map well to hardware-based deep learning accelerators. For example, conventional approaches to performing grouped convolution operations on deep learning accelerators deliver low architectural utilization on most accelerators.

DETAILED DESCRIPTION

Figure 1:
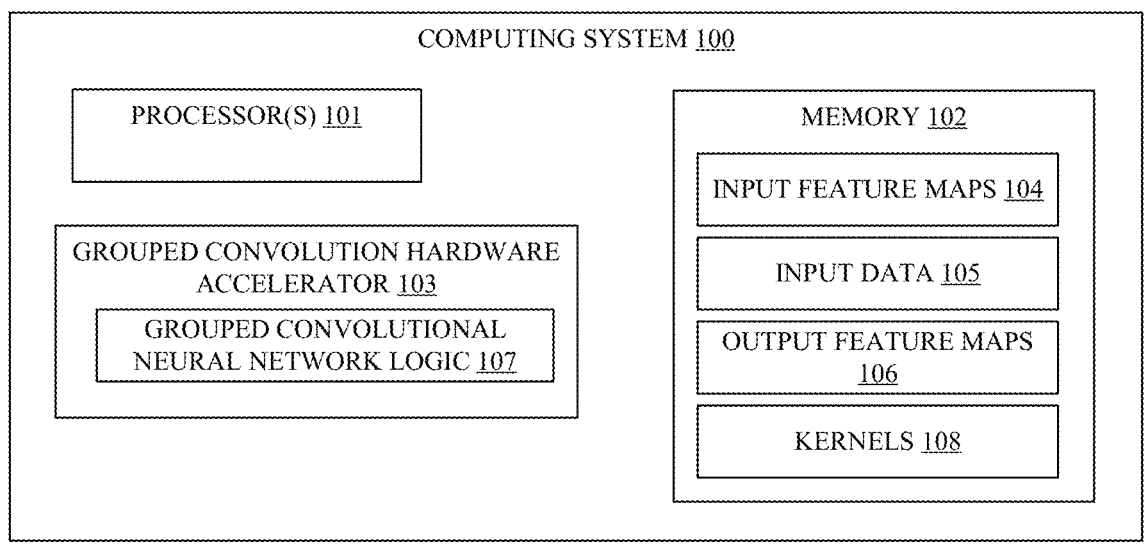
FIG. 1 illustrates an embodiment of a system.

Embodiments disclosed herein provide novel single instruction multiple data (SIMD) architectures for implementing grouped convolution operations on a native three-dimensional (3D) convolution engine with full utilization of the underlying hardware accelerator. Advantageously, embodiments disclosed herein provide the improved utilization of the hardware accelerator without compromising the performance, energy use, and/or architectural utilization of standard 3D convolution operations. Generally, when performing a grouped convolution operation, the 3D grid of processing elements of the hardware accelerator self-organize into an array of smaller 3D grids that work in tandem with a common input memory to deliver the required acceleration. Furthermore, the smaller grids implement multiple groups in parallel and/or in the output feature map (OFM) y-dimension (e.g., a height of the feature map) based on configurable logic. A control finite state machine (FSM) may exploit the convolutional reuse of input feature maps to schedule the threads/grids in a staggered manner and avoid memory conflict. For example, each row of a feature map is used for K cycles in the case of a K by K kernel (where K is any positive integer). By exploiting this reuse, embodiments disclosed herein may improve parallel processing without memory conflict, resulting in higher throughputs and lower latency for grouped convolutions. This technique facilitates the implementation of multiple sub-layers/groups in parallel on the same hardware accelerator autonomously and without software intervention. This improved mode of operation (e.g., the grouped convolution mode) is provided on the hardware accelerator without any structural changes to the conventional data path, and therefore does not affect the performance of standard 3D convolution operations on the hardware accelerator.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an embodiment of a system 100 that provides efficient hardware architectures for accelerating grouped convolutions. The system 100 may be any type of computing system, such as a server, workstation, laptop, or virtualized computing system. For example, the system 100 may be an embedded system such as a deep learning accelerator card, a processor with deep learning acceleration, a neural compute stick, or the like. In some examples, the system 100 comprises a System on a Chip (SoC) and, in other embodiments, the system 100 includes a printed circuit board or a chip package with two or more discrete components. The system 100 includes one or more processors 101 (also referred to as processing circuitry) and a memory 102. The configuration of the computing system 100 depicted in FIG. 1 should not be considered limiting of the disclosure, as the disclosure is applicable to other configurations.

The processor 101 is representative of any type of computer processor circuits, such as, central processing units, graphics processing units, or otherwise any processing unit. Further, one or more of the processors may include multiple processors, a multi-threaded processor, a multi-core processor (whether the multiple cores coexist on the same or separate dies), and/or a multi-processor architecture of some other variety by which multiple physically separate processors are in some way linked. The memory 102 is representative of any type of information storage technology, including volatile technologies requiring the uninterrupted provision of electric power, and including technologies entailing the use of machine-readable storage media that may or may not be removable. Thus, the memory 102 may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although the memory 102 is depicted as a single block, the memory 102 may include multiple storage devices that may be based on differing storage technologies. Thus, for example, the memory 102 may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid-state memory devices enabling relatively quick access to programs and/or data (e.g., SRAM or DRAM). It should also be noted that the memory 102 may be made up of multiple storage components based on identical storage technology, but which may be maintained separately as a result of specialization in use (e.g., some DRAM devices employed as a main storage while other DRAM devices employed as a distinct frame buffer of a graphics controller).

As shown, the system 100 includes a grouped convolution hardware accelerator 103 (which may be referred to herein as "the accelerator" 103 for brevity). The accelerator 103 is logic implemented in hardware that is optimized to perform convolution operations, including grouped convolution operations. The accelerator 103 may be any type of hardware, such as a SoC, graphics processor, CPU, and the like. The accelerator 103 includes the grouped convolutional neural network logic 107, which is logic for a convolutional neural network (CNN) configured to perform accelerated convolution operations that may fully utilize the processing and/or memory resources of the accelerator 103. Generally, a CNN is formed of a cascade of multiple layers of nonlinear processing units for feature extraction and transformation. Each successive layer of the CNN uses the output from the previous layer as input. The CNN may generally include an input layer, an output layer, and multiple hidden layers. The hidden layers of a CNN may include convolutional layers, pooling layers, fully connected layers, and/or normalization layers.

Generally, a neural network includes two processing phases, a training phase and an inference phase. During the training phase, a deep learning expert may architect the network, establishing the number of layers in the neural network, the operation performed by each layer, and the connectivity between layers. Many layers have parameters, typically filter weights, that determine exact computation performed by the layer. The objective of the training process is to learn the filter weights, usually via a stochastic gradient descent-based excursion through the space of weights. The training phase generates an output feature map, also referred to as an activation tensor. An activation tensor may be generated for each convolutional layer of the CNN of the logic 107. The output feature map (OFM), such as an OFM 106 depicted in the memory 103, of a given convolutional layer may be the input to the next convolutional layer (e.g., an input feature map (IFM) 104 in the memory 103). Once the training process is complete, inference based on the trained neural network typically employs a forward-propagation calculation for input data to generate output data.

For example, the computing system 100 may provide the grouped CNN logic 107 with cascaded stages for face detection, character recognition, speech recognition, or the like. The grouped CNN logic 107 may then perform training based on an input dataset (e.g., images of faces, handwriting, printed information, etc.) that is in the form of tensor data. A tensor is a geometric object that describes linear relations between geometric vectors, scalars, and other tensors. An organized multidimensional array of numerical values, or tensor data, may represent a tensor. The training may produce refined weights for the grouped CNN logic 107. For example, the refined weights may specify features that are characteristic of numerals and/or each letter in the English alphabet. During the inference phase, the grouped CNN logic 107 may receive images as input (e.g., input data 105), and perform desired processing on the input images. For example, the input images may depict handwriting, and the trained grouped CNN logic 107 may identify numerals and/or letters of the English alphabet included in the handwriting.

Figure 2A:
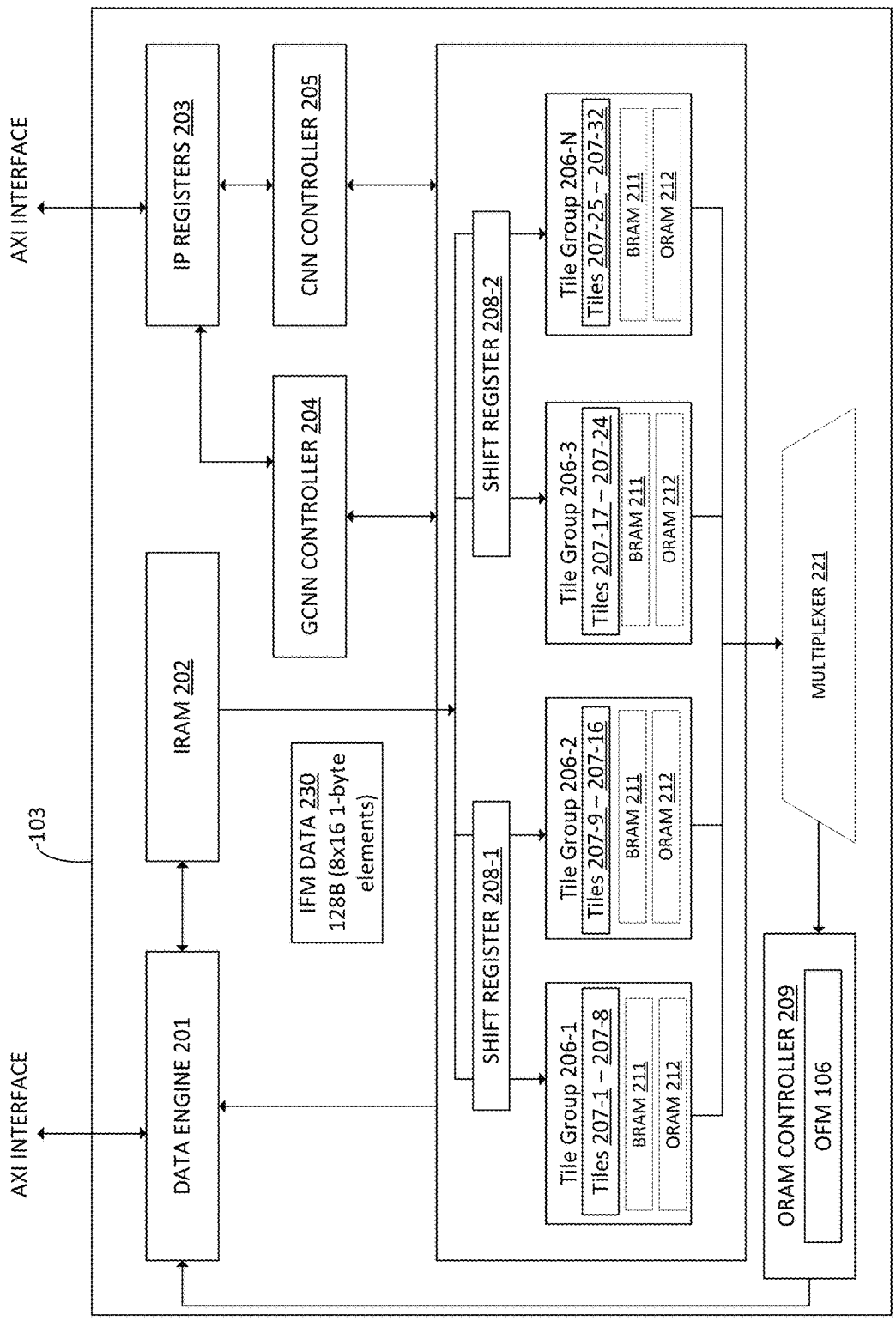
FIGS. 2A-2C illustrates examples of efficient hardware architectures for accelerating grouped convolutions.

FIG. 2A is schematic 200 illustrating example components of the accelerator 103, which may include the grouped CNN logic 107, in greater detail. As shown, the accelerator 103 may include a data engine 201, an input memory (or IRAM) 202, one or more IP registers 203 (also referred to as configuration registers), a grouped convolutional neural network (GCNN) controller 204, a convolutional neural network (CNN) controller 205, two or more shift registers 208, a plurality of tile groups 206-1 through 206-N (where N is any positive integer greater than 3), an output memory (or ORAM) controller 209, and a multiplexer 221. The data engine 201 is configured to receive IFMs 104 and CNN kernel 108 data from the memory 103 of the system 100 and return OFMs 106 to the memory 103 once computed by the components of the accelerator 103. For example, the data engine 201 may receive one or more IFMs 104 and/or kernels 108 from the memory 103 and store the received IFMs 104 in the IRAM 202. The IP registers 203 store the topology and layer information for the grouped CNN logic 107, which may include number of layers, types of layers, kernel size, node information, node weights, etc.

The GCNN controller 204 is a finite state machine to issue instructions to the components of the accelerator 103 when operating in grouped convolution mode, including managing the overall processing flow for grouped convolution operations performed using the accelerator 103. Similarly, the CNN controller 205 is an FSM to issues instructions to the components of the accelerator 103 when operating in conventional CNN mode. Therefore, by implementing the GCNN controller 204 and the CNN controller 205, the accelerator 103 is configured to efficiently process grouped CNN operations as well as conventional CNN operations.

Figure 3:
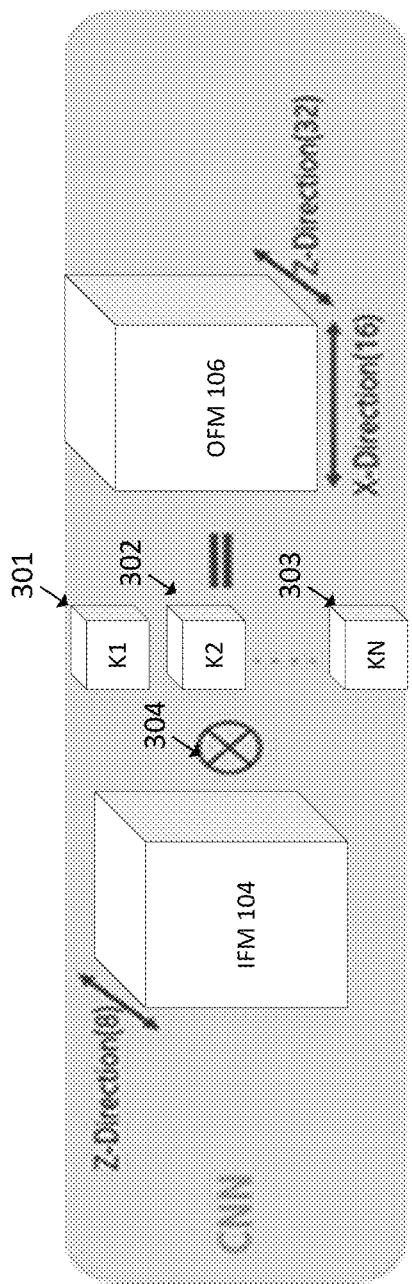
FIG. 3 illustrates an example grouped convolution operations.

FIG. 3 is a schematic 300 illustrating an embodiment of the SIMD directions used when performing a grouped convolution operation using the accelerator 103. As shown, one or more IFMs 104 may be stacked to provide a three dimensional IFM with the depth represented by the z, or IFM(z) direction. One or more kernels, K1-KN, where N is any positive integer greater than 2, may be used to process convolution operations (illustrated by the operation 304) in FIG. 3. FIG. 3 illustrates 3 example kernels 301, 302, 303, which may be of any dimension, such as (3,3), (4,4), and so on. The output of the grouped convolution operation is one or more OFMs 106.

Generally, a conventional, or standard, convolution operation (e.g., orchestrated by the CNN controller 205) reflects an all-to-all computing concept for using IFMs to generate OFMs. For example, in a conventional convolution operation, each of 16 IFMs 104 may be used to produce 16 OFMs 106. However, in grouped convolution operations, there may be a group of IFMs which may be used to compute a group to OFMs. For example, in a grouped convolution operation orchestrated by the GCNN 204, the 16 IFMs may be divided into four groups, where each group is used to generate a respective OFM of 4 OFMs. Doing so reduces the computation required by a factor of 4. However, in such examples, the parallelism is within a group. In the example depicted in FIG. 3, the IFM(z) depth of the IFMs 104 is 8, while the x-direction OFM(x) of the OFM 106 is 16, and the z-direction OFM(z) is 32.

Generally, most deep learning topologies leverage a two-dimensional (2D) convolution using three-dimensional input. In the conventional CNN solutions, as stated, all of the input feature maps contribute to each individual output feature map. However, these topologies offer many data parallelism opportunities in the OFM(x) (the width), OFM (y) (height), IFM(z), and OFM(z) dimensions. Indeed, many hardware accelerators may use the IFM(z) and OFM(z) directions to implement data parallelism, as these dimensions may be larger (and in multiples of 64) for most topologies and/or layers. This also aligns with conventional cache line sizes in most hardware platforms, and may offer the best all-around utilization for many topologies in use today. However, without the techniques of the disclosure, conventional hardware accelerators implemented with IFM (z) dimensions of 32 and/or 64 will underperform on grouped convolution operations, because the number of IFMs provided to a group can be as low as 1 (depth wise separable convolutions). Advantageously, however, using the SIMD depicted in FIG. 3, may improve performance using the accelerator 103 in grouped convolution mode.

Returning to FIG. 2A, therefore, the GCNN controller may cause the formation of tile groups 206-1 through 206-N, where N is any integer greater than 3. As shown, each tile group 206 includes a plurality of tiles 207. In the example depicted in FIG. 2A, each thirty two tiles 207-1 through 207-32 are depicted. In such an example, each tile group 206 includes 8 tiles. More generally, the tile groups 206-1 through 206-N reflect a 3D compute grid organized as an array of 32 tiles 207, with each tile having a fixed number of processing elements (PEs). For example, as shown, tile group 206-1 includes tiles 207-1 through 207-8, and so on. Each tile group 206 may share a BRAM 211 for storing input data such as IFMs 104, input data 105, and/or kernels 108. The tile groups 206 may further share an ORAM 212 for storing intermediate OFMs 106 (e.g., a convolution operation requires several compute cycles, and the intermediate output may correspond to the output of one or more such compute cycles).

Figure 2B:
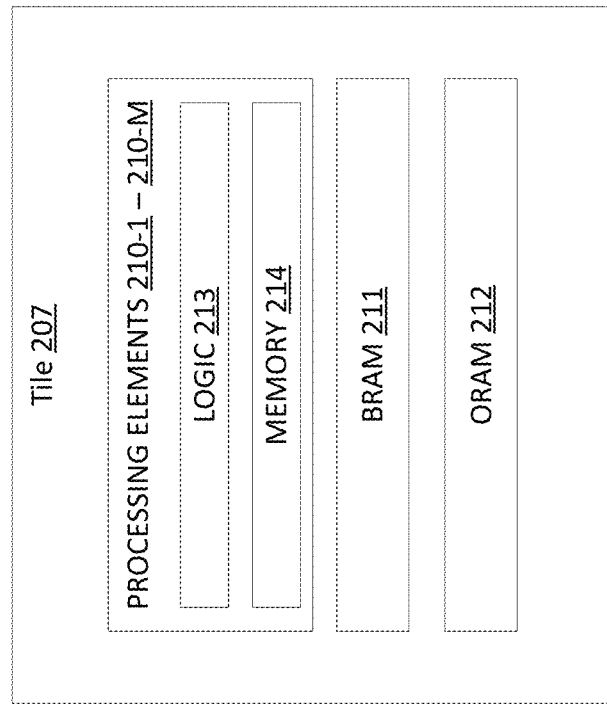

FIG. 2B depicts an example tile 207, according to one embodiment. Each tile includes PEs 210-1 through 210-M, where M is any positive integer. In one example, 8 processing elements 210-1 through 210-8 are provided in the tile 207. Each PE 210 includes logic 213 and memory 214. The logic 213 may include hardware logic configured to compute multiply and accumulate (MAC) operations used in convolution computations. Generally, a MAC operation involves computing the product of two numbers and adding the product to an accumulator, which may be stored in the memory 214 and/or ORAM 212. Other types of convolution operations may be provided by the logic 213, such as matrix multiplication operations, dot product operations, and the like. The input to the PEs may be provided by the BRAM 211, which may include IFMs 104 and/or kernels 108.

Intermediate OFMs generated by the PEs 210 may be stored in the ORAM 212. More generally, each PE 210 processes 8 MACs of input feature maps and/or kernels in parallel, providing the third SIMD dimension. As such, the tile groups 206-1 through 206-N may collectively compute four OFM rows in parallel.

Returning to FIG. 2A, as stated, the IRAM 202 may store the IFMs 104 and/or kernels 108 received from the memory 103 by the data fetch engine 201. The IRAM 202 may store other data, such as the input data 105, used to perform a grouped convolution operation using the accelerator. As shown, the IRAM 202 may provide IFM data 230 to the shift registers 208-1 and/or 208-2. The IFM data 230 includes a least a portion of one or more input feature maps 104 stored in the IRAM 202. The shift registers 208 may include storage (e.g., a row of flops) sufficient to store 128 bytes (or 8×16 1-byte elements of the input feature maps 104). Therefore, in the example depicted in FIG. 2A, four tile groups 206-1 through 206-N are provided. Each tile group 206 may process one group of four IFMs to produce at least a portion of one OFM as output. Therefore, the tile groups 206-1 through 206-N collectively compute 4 OFMs 106 as output in parallel as described in greater detail herein.

Generally, each tile group 206-1 through 206-N includes a shared input memory to read in the inputs from the shift registers 208. As shown, shift register 208-1 serves tile groups 206-1 and 206-2, while shift register 208-2 serves tile groups 206-3 and 206-N. Doing so allows the input features to be reused over K cycles, where K is the dimensionality of the kernels 108. The GCNN controller 204 generally triggers the computations in the tile groups 206 in a staggered manner such that the memory reads and/or writes from the tile groups 206 do not overlap and/or conflict. The shift registers 208-1 and 208-2 are used to supply unique IFM data to each tile group 206. Doing so allows the tiles (and PEs thereof) to compute different rows (or different portions of a given row) of the OFM 106 in parallel. The shift registers 208-1, 208-2 are filled in a staggered fashion. The output (e.g., at least a portion of one or more rows of the OFM 106) of each tile group 206-1 through 206-N may be provided to the multiplexer 221, which provides the output to the ORAM controller 209, which may assemble the output into the OFM 106.

Figure 4:
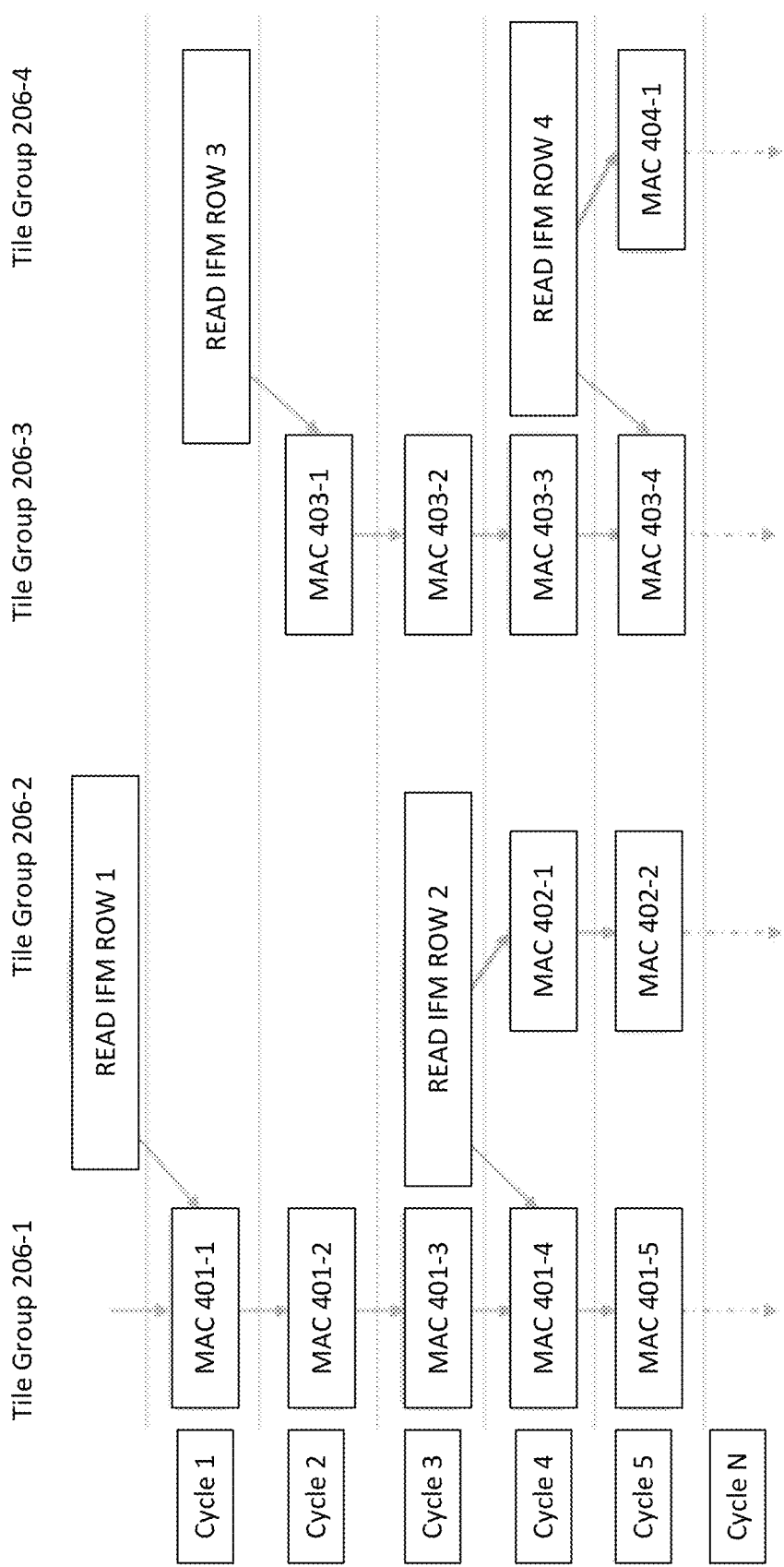
FIG. 4 illustrates an example processing flow for efficient hardware architectures for accelerating grouped convolutions.

FIG. 4 is a schematic illustrating an example staggered compute flow 400 performed by the accelerator 103 where the kernels 108 are of size (3,3) in the (x,y) dimension, e.g., a 3×3 matrix. Illustratively, a convolution operation involves moving the kernel 108 over the IFM 104 in strides to produce an OFM 106. Therefore, some rows of the IFM are unique, while there may be overlap due to the kernel size (e.g., the first row of an IFM is only processed once, while the second and third rows may be processed multiple times as the kernel is passed over the IFM).

In the compute flow 400, operations performed by each tile group 206-1 through 206-4 of FIG. 2A is illustrated over N cycles. For example, at cycle 1, a first row of the IFM 104 is read from the IRAM 202 and stored in the shift register 208-1. The first row of IFM data stored in cycle 1 may be used for 3 cycles (e.g., the size of the kernel 108) to compute a portion of a first row of the OFM 106. In cycle 1, therefore, the PEs 210 of the tiles 207 of tile group 206-1 may compute a MAC operation 401-1. The MAC operation 401-1 may be based on the first row of the IFM 104 and the kernel 108. Doing so may produce an intermediate output pixel, which may be stored in the ORAM 212. In cycle 2, the data in the shift register 208-1 (e.g., the first row of the IFM 104) is shifted (e.g., a left shift) and the tile group 206-1 may compute a second MAC operation 401-2. Doing so computes another intermediate output pixel stored in the ORAM 212. In cycle 3, the data in the shift register 208-1 is shifted and the tile group 206-1 may compute a third MAC operation 401-3. At this point, tile group 206-1 has computed 3 MAC operations, producing a portion of the first row of the OFM 106. To complete the first row of the OFM 106 in a 3×3 kernel example, the processing flow continues such that 6 additional MAC operations are performed collectively by the tile groups 206.

Returning to cycle 2, as shown, a third row of the IFM 104 is read from the IRAM 202 and stored in the buffer 208-2. In cycle 2, therefore, the PEs 210 of the tiles 207 of tile group 206-3 may compute a MAC operation 403-1. The MAC operation 401-1 may be based on the third row of the IFM 104 and the kernel 108. Doing so may produce an intermediate output pixel, which may be stored in the ORAM 212 for tile group 206-3. In cycle 3, the data in the shift register 208-2 (e.g., the third row of the IFM 104) is shifted (e.g., a left shift) and the tile group 206-3 may compute a second MAC operation 403-2. Doing so computes another intermediate output pixel stored in the ORAM 212. In cycle 4, the data in the shift register 208-3 is shifted and the tile group 206-3 may compute a third MAC operation 403-3.

In cycle 4, the second row of the IFM 104 may be read from the IRAM 202 and stored in the shift register 208-1. Because this is an "overlapping" row, in cycle 4, tile group 206-1 computes a fourth MAC operation 401-4, while tile group 206-2 computes a first MAC operation 402-1. At cycle 5, the fourth row of the IFM 104 is read from the IRAM 202 and stored in the shift register 208-2. At this point, full parallelism may be achieved, as each tile group 206 is performing MAC operations. More specifically, tile group 206-1 computes MAC 401-5, tile group 206-2 computes MAC 402-2, tile group 206-3 computes MAC 403-4, and tile group 206-4 computes MAC 404-1. The processing flow 400 may repeat in a pipelined fashion until all rows of each IFM 104 have been processed. In one embodiment, the number of shifts of a given shift register is K−1, where K is any positive integer corresponding to a size of the kernel 108. For example, as stated, in a 3×3 kernel example, 9 total MAC operations are performed to compute a row of the OFM.

As stated, the compute flow 400 may be based on the kernel size and/or kernel stride. This avoids datapath changes and therefore does not require modifications to conventional (e.g., ungrouped) convolutions orchestrated by the CNN controller 205. The only modification to the accelerator 103 is the addition of the GCNN controller 204 and an extra shift register (e.g., one of the shift registers 208). However, in some embodiments, the number of IFMs 104 and/or number of OFMs 106 may be less than 8.

Figure 2C:
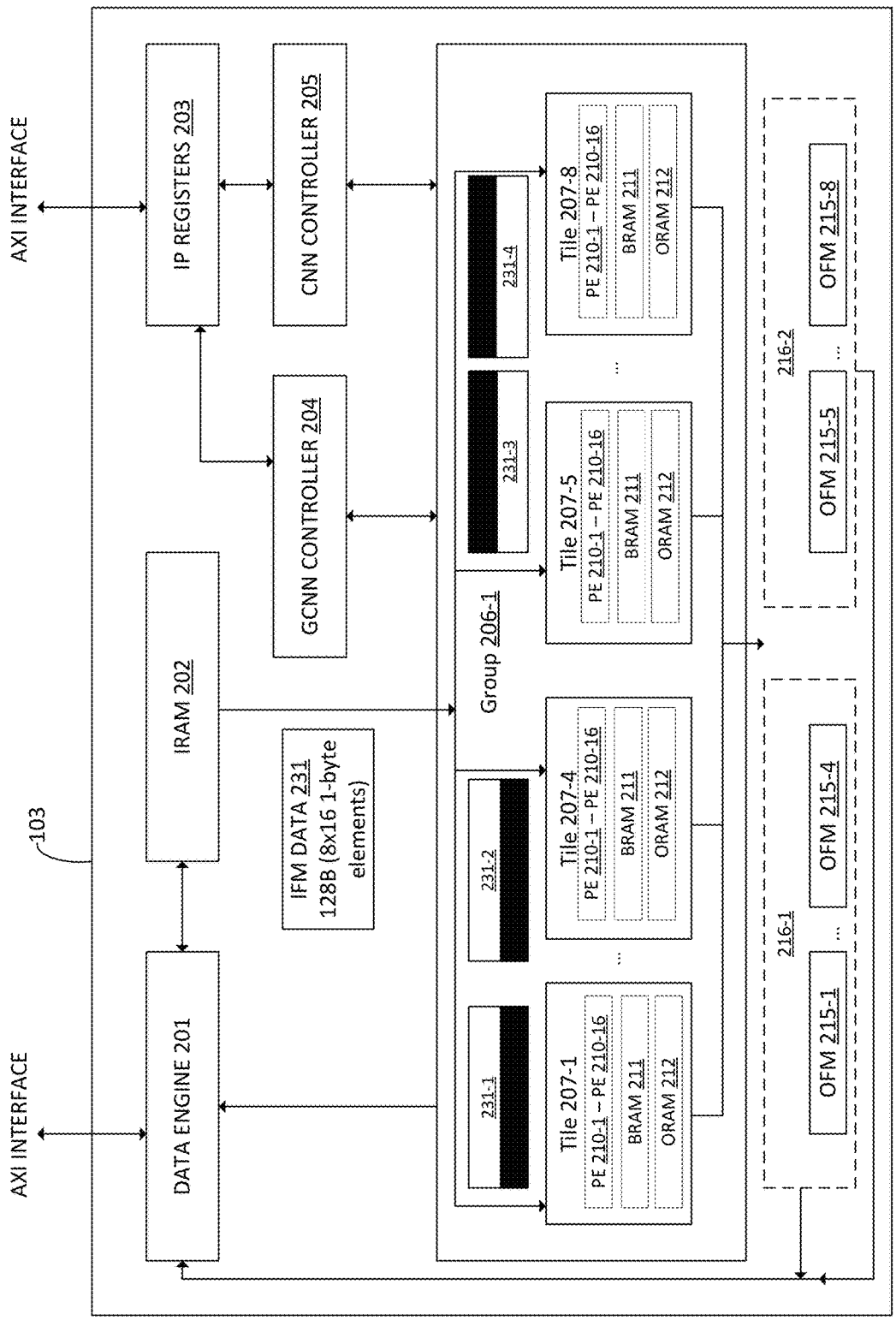

FIG. 2C depicts an embodiment of organizing the tile groups 206 to accommodate smaller group sizes, e.g., where the number of IFMs 104 and/or OFMs 106 is less than 8. More specifically, FIG. 2C depicts an embodiment where the group size is (4,4). Generally, since the bandwidth requirements for IFM 104 data is lower relative to larger group sizes, the bandwidth requirements may be served in parallel by the IRAM 202 without any extra scheduling restrictions. For example, the IFMs 104 required by all groups are computed in parallel are read simultaneously from the IRAM 202, which may be masked by the GCNN controller 204 (or other logic configured to perform an AND operation on IFM data 231 read from the IRAM 202).

As stated, the accelerator 103 may provide an example 16×8×8 3D grid of tiles. In examples where the number of IFMs 104 and/or OFMs 106 is less than 8, the 3D grid may be transformed into different topologies. For example, where the number of OFMs 106 are equal to 1, the 16×8×8 grid may be transformed into eight (1,1,16), or 1×1×16, grids for depth wise/2D convolutions, where each of the 8 grids operates in parallel. Where the number of OFMs 106 are greater than 1 and less than or equal to two, the 16×8×8 grid may be transformed into four (2,2,16), or 2×2×16, grids, where each of the four grids operates in parallel. Similarly, where the number of OFMs 106 are greater than 2 and less than or equal to four, the 16×8×8 grid may be transformed into two (4,4,16), or 4×4×16, grids, where each of the two grids operates in parallel.

Therefore, as shown in FIG. 2C, the example group 206-1 receives IFM data 231 from the IRAM 202, where the IFM data 231 is 128 bytes, or 8×16 1-byte elements of the IFMs 104. However, as shown, each tile 207-1 through 207-8 operates on different portions of the IFM data 231 which have been masked appropriately. For example, tile 207-1 may process the IFM data 231-1, tile 207-4 may process IFM data 231-2, tile 207-5 may process IFM 231-3, and tile 207-8 may process IFM data 231-4. Generally, the shaded portions of IFM data 231-1 through 231-4 reflect the portion processed by the tiles 207. Therefore, for example, continuing with the example where IFM data 231 is 128 bytes, or 8×16 1-byte elements, IFM 231-1 processed by tile 207-1 may correspond to bytes 5-8 in the height direction and bytes 0-15 in the y-direction, and so on. Illustratively, the output _includes output group 216-1, which includes OFM 215-1 through OFM 215-4, which may be computed by tiles 207-1 through 207-4, respectively. Similarly, output group 216-2 includes OFM 215-5 through 215-8, which may be computed by tiles 207-5 through 207-8, respectively. The output controller 209 may assemble the output and provide the assembled OFM to the data engine 201 to be stored in the memory 103.

Operations for the disclosed embodiments may be further described with reference to the following and/or preceding figures. Some of the figures may include a logic flow. Although such figures presented herein may include a particular logic flow, such as the logic flow 400, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
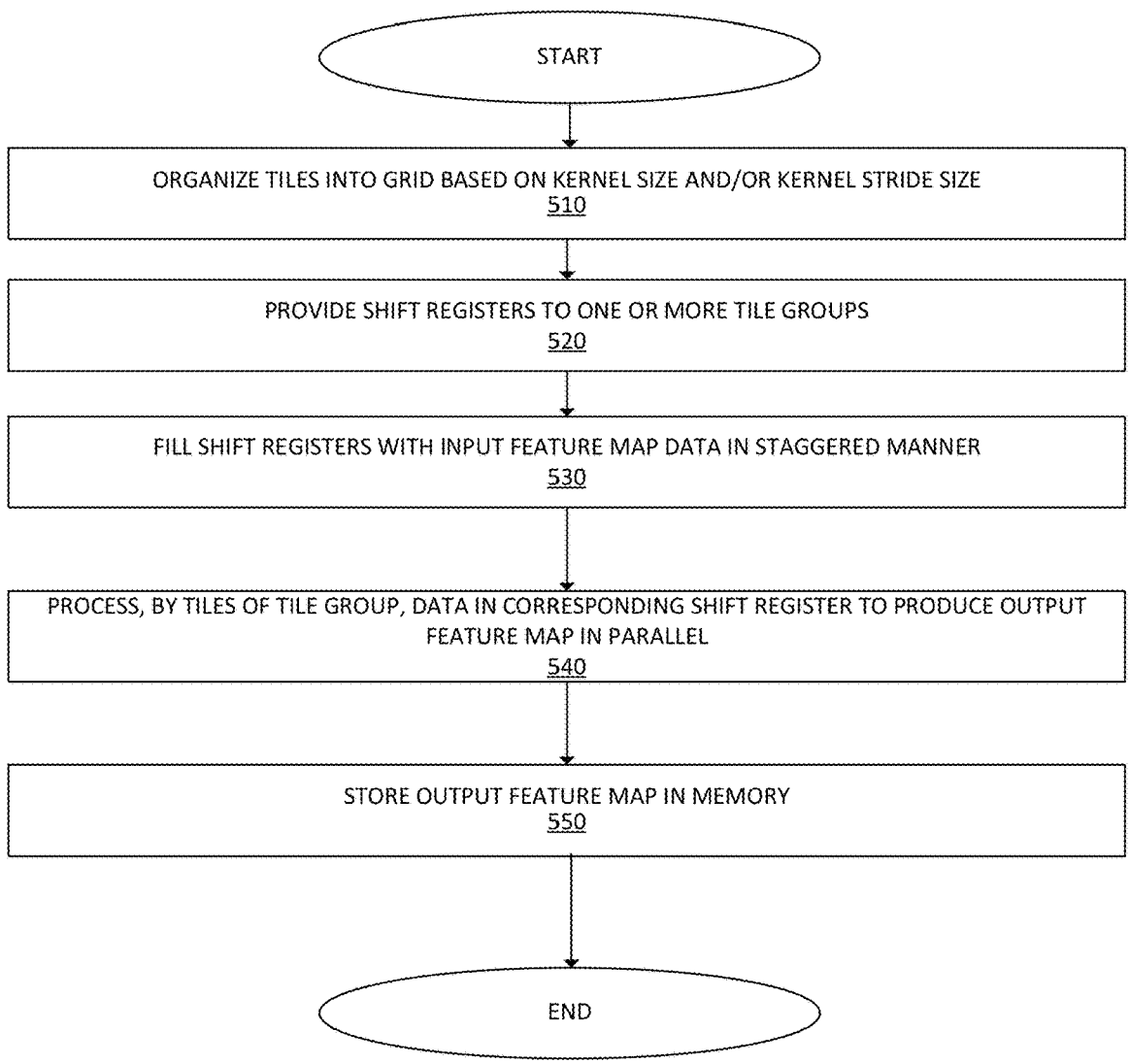
FIG. 5 illustrates an example of a first logic flow.

FIG. 5 illustrates an embodiment of a logic flow 500. The logic flow 500 may be representative of some or all of the operations executed by one or more embodiments described herein. For example, the logic flow 500 may represent some or all of the operations performed by the accelerator 103. Embodiments are not limited in this context.

As shown, the logic flow 500 begins at block 510, where the tiles 207 of the hardware accelerator 103 are organized into a compute grid based on a size of the kernel 108 and/or a kernel stride size. The kernel size and/or the kernel stride size may be specified in the IP registers 203, e.g. based on compiling an instance of a grouped CNN. At block 520, at least two shift registers 208 may be provided, where two or more tile groups 206 may share one of the at least two shift registers 208. At block 530, the shift registers are filled with IFM data in a staggered manner, e.g., according to the logic flow 400. At block 540, the tiles of the tile groups process the data in the shift registers to produce an output feature map in parallel, e.g., according to the logic flow 400. At block 550, the OFM 106 may be assembled and stored in the memory 103.

Figure 6:
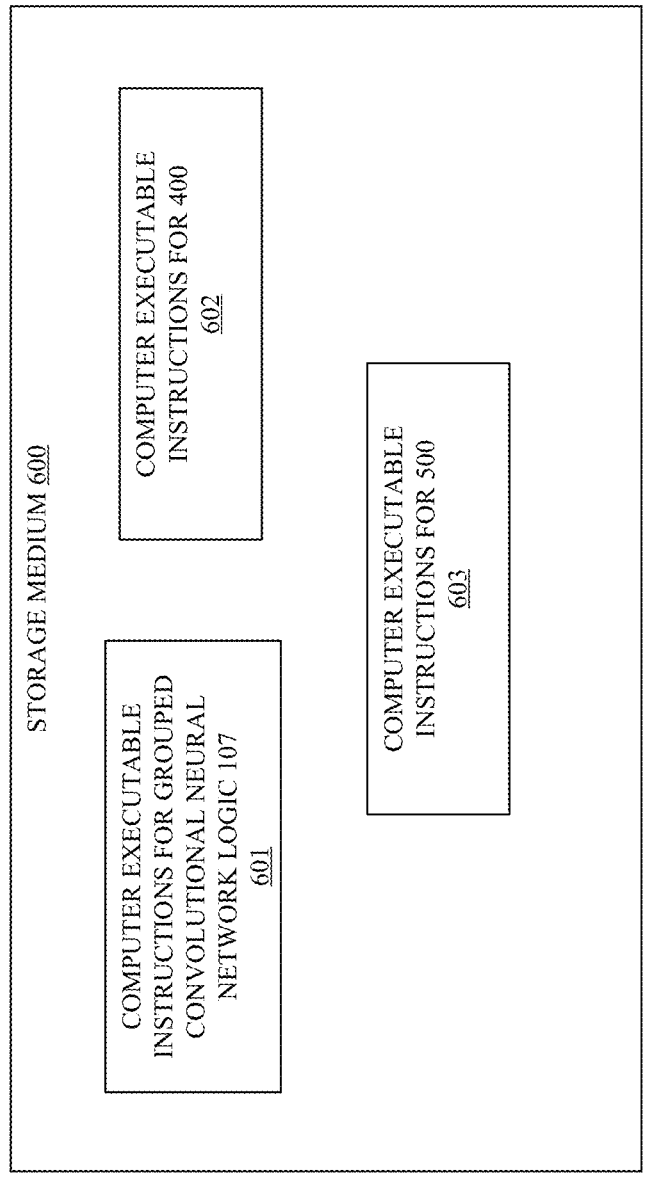
FIG. 6 illustrates an example of a storage medium.

FIG. 6 illustrates an embodiment of a storage medium 600. Storage medium 600 may comprise any non-transitory computer-readable storage medium or machine-readable storage medium, such as an optical, magnetic or semiconductor storage medium. In various embodiments, storage medium 600 may comprise an article of manufacture. In some embodiments, storage medium 600 may store computer-executable instructions, such as computer-executable instructions to implement one or more of logic flows or operations described herein, such as instructions 601 for the grouped CNN logic 107, which may include a complied instance of a convolutional neural network. Similarly, the storage medium 600 may store computer-executable instructions 602 for logic flow 400 of FIG. 4, and computer-executable instructions 603 for logic flow 500 of FIG. 5. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 7:
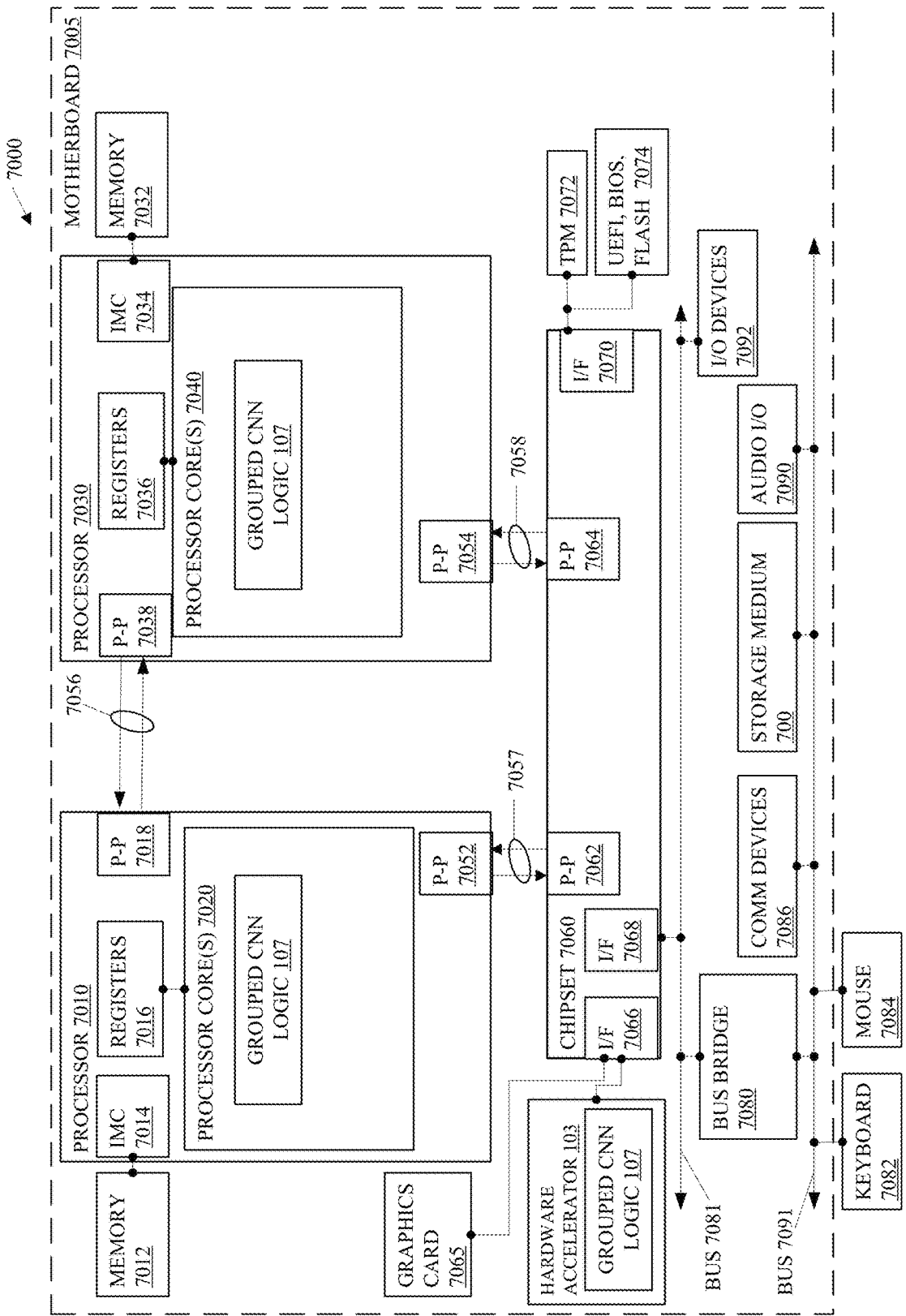
FIG. 7 illustrates an example of a system.

FIG. 7 illustrates an embodiment of a system 7000. The system 7000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 7000 may have a single processor with one core or more than one processor. Note that the term "processor" refers to a processor with a single core or a processor package with multiple processor cores. In at least one embodiment, the computing system 7000 is representative of the system 100. More generally, the computing system 7000 is configured to implement all logic, systems, logic flows, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary system 7000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 7, system 7000 comprises a motherboard 7005 for mounting platform components. The motherboard 7005 is a point-to-point interconnect platform that includes a first processor 7010 and a second processor 7030 coupled via a point-to-point interconnect 7056 such as an Ultra Path Interconnect (UPI). In other embodiments, the system 7000 may be of another bus architecture, such as a multi-drop bus. Furthermore, each of processors 7010 and 7030 may be processor packages with multiple processor cores including processor core(s) 7020 and 7040, respectively. While the system 7000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 7010 and the chipset 7060. Some platforms may include additional components and some platforms may only include sockets to mount the processors and/or the chipset.

The processors 7010, 7020 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processors 7010, 7020.

The first processor 7010 includes an integrated memory controller (IMC) 7014 and point-to-point (P-P) interfaces 7018 and 7052. Similarly, the second processor 7030 includes an IMC 7034 and P-P interfaces 7038 and 7054. The IMC's 7014 and 7034 couple the processors 7010 and 7030, respectively, to respective memories, a memory 7012 and a memory 7032. The memories 7012 and 7032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 7012 and 7032 locally attach to the respective processors 7010 and 7030. In other embodiments, the main memory may couple with the processors via a bus and shared memory hub.

The processors 7010 and 7030 comprise caches coupled with each of the processor core(s) 7020 and 7040, respectively. In the present embodiment, the processor core(s) 7020 of the processor 7010 and the processor core(s) 7040 of processor 7030 include the grouped CNN logic 107. The processor cores 7020, 7040 may further memory management logic circuitry (not pictured) which may represent circuitry configured to implement the functionality of the accelerator 103 in the processor core(s) 7020, 7040, or may represent a combination of the circuitry within a processor and a medium to store all or part of the functionality of the grouped CNN logic 107 in memory such as cache, the memory 7012, buffers, registers, and/or the like. In several embodiments, the functionality of the accelerator 103 and/or grouped CNN logic 107 resides in whole or in part as code in a memory such as the storage medium 700 attached to the processors 7010, 7030 via a chipset 7060. The functionality of the grouped CNN logic 107 and associated data may also reside in whole or in part in memory such as the memory 7012 and/or a cache of the processor. Furthermore, the functionality of the accelerator 103 and/or grouped CNN logic 107 may also reside in whole or in part as circuitry within the processor 7010 and may perform operations, e.g., within registers or buffers such as the registers 7016, 7036 within the processors 7010, 7030, or within an instruction pipeline of the processors 7010, 7030. Further still, the functionality of the grouped CNN logic 107 may be integrated a processor of the hardware accelerator 103 for generating output feature maps 106.

As stated, more than one of the processors 7010 and 7030 may comprise functionality of the grouped CNN logic 107, such as the processor 7030 and/or a processor within the hardware accelerator 103 coupled with the chipset 7060 via an interface (I/F) 7066. The I/F 7066 may be, for example, a Peripheral Component Interconnect-enhanced (PCI-e).

The first processor 7010 couples to a chipset 7060 via P-P interconnects 7052 and 7062 and the second processor 7030 couples to a chipset 7060 via P-P interconnects 7054 and 7064. Direct Media Interfaces (DMIs) 7057 and 7058 may couple the P-P interconnects 7052 and 7062 and the P-P interconnects 7054 and 7064, respectively. The DMI may be a high-speed interconnect that facilitates, e.g., eight Giga Transfers per second (GT/s) such as DMI 3.0. In other embodiments, the processors 7010 and 7030 may interconnect via a bus.

The chipset 7060 may comprise a controller hub such as a platform controller hub (PCH). The chipset 7060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 7060 may comprise more than one controller hub such as a chipset with a memory controller hub, a graphics controller hub, and an input/output (I/O) controller hub.

In the present embodiment, the chipset 7060 couples with a trusted platform module (TPM) 7072 and the UEFI, BIOS, Flash component 7074 via an interface (I/F) 7070. The TPM 7072 is a dedicated microcontroller designed to secure hardware by integrating cryptographic keys into devices. The UEFI, BIOS, Flash component 7074 may provide pre-boot code.

Furthermore, chipset 7060 includes an I/F 7066 to couple chipset 7060 with a high-performance graphics engine, graphics card 7065. In other embodiments, the system 7000 may include a flexible display interface (FDI) between the processors 7010 and 7030 and the chipset 7060. The FDI interconnects a graphics processor core in a processor with the chipset 7060.

Various I/O devices 7092 couple to the bus 7081, along with a bus bridge 7080 which couples the bus 7081 to a second bus 7091 and an I/F 7068 that connects the bus 7081 with the chipset 7060. In one embodiment, the second bus 7091 may be a low pin count (LPC) bus. Various devices may couple to the second bus 7091 including, for example, a keyboard 7082, a mouse 7084, communication devices 7086 and the storage medium 700 that may store computer executable code as previously described herein. Furthermore, an audio I/O 7090 may couple to second bus 7091. Many of the I/O devices 7092, communication devices 7086, and the storage medium 700 may reside on the motherboard 7005 while the keyboard 7082 and the mouse 7084 may be add-on peripherals. In other embodiments, some or all the I/O devices 7092, communication devices 7086, and the storage medium 700 are add-on peripherals and do not reside on the motherboard 7005.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

The following examples pertain to further embodiments, from which numerous permutations and configurations will be apparent.

Example 1 is a method, comprising: receiving, by a first buffer of a hardware accelerator, a first row of an input feature map (IFM) from a memory; receiving, by a first group comprising a first plurality of tiles, a first row of the IFM from the first buffer, wherein each tile of the first group comprises a plurality of processing elements; computing, by the plurality of processing elements of the first plurality of tiles, at least a portion of a first row of an output feature map (OFM) based on the first row of the IFM and a kernel; receiving, by a second buffer, a third row of the IFM from the memory; receiving, by a second group comprising a plurality of tiles, the third row of the IFM from the second buffer, wherein each tile of the second group comprises a plurality of processing elements; and computing, by the plurality of processing elements of the second plurality of tiles, at least a portion of a third row of the OFM based on the third row of the IFM and the kernel, wherein the portions of the first and third rows of the OFM are computed by the hardware accelerator in parallel as part of a grouped convolution operation.

Example 2 includes the subject matter of example 1, wherein computing the portion of the first row of the OFM comprises: performing a multiply-accumulate (MAC) operation on the first row of the IFM and the kernel in a first cycle; shifting, in the first buffer, the first row of the IFM to produce a first shifted first row of the IFM; receiving, by the first group, the first shifted first row of the IFM; performing the MAC operation on the first shifted first row of the IFM and the kernel in a second cycle; shifting, in the first buffer, the first shifted first row of the IFM to produce a second shifted first row of the IFM; and performing the MAC operation on the second shifted first row of the IFM and the kernel in a third cycle.

Example 3 includes the subject matter of example 2, wherein computing the portion of the third row of the OFM comprises: performing the MAC operation on the third row of the IFM and the kernel in the second cycle; shifting, in the second buffer, the first row of the IFM to produce a first shifted third row of the IFM; receiving, by the second group, the first shifted third row of the IFM; performing the MAC operation on the first shifted third row of the IFM and the kernel in the third cycle; shifting, in the second buffer, the first shifted third row of the IFM to produce a second shifted third row of the IFM; and performing the MAC operation on the second shifted third row of the IFM and the kernel in a fourth cycle.

Example 4 includes the subject matter of example 3, further comprising: receiving, by the first buffer, a second row of the IFM from the memory; receiving, by the second buffer, a fourth row of the IFM from the memory; computing at least a second portion of the first row of the OFM based at least in part on the second row of the IFM; and computing at least a portion of a fourth row of the OFM based at least in part on the fourth row of the IFM, wherein the second portion of the first OFM and the portion of the fourth row of the OFM are computed by the hardware accelerator in parallel.

Example 5 includes the subject matter of example 1, further comprising: determining a size of the kernel or a stride size of the kernel specified in one or more configuration registers; generating the first group and the second group based at least in part on the size of the kernel or the stride size of the kernel; and organizing the tiles of the first group and the second group into a compute grid based at least in part on the size of the kernel or the stride size of the kernel.

Example 6 includes the subject matter of example 1, wherein the hardware accelerator comprises logic for a convolutional neural network, wherein the hardware accelerator is configured to perform grouped convolution operations using the convolutional neural network.

Example 7 includes the subject matter of example 1, further comprising: computing each of a plurality of rows of the OFM, wherein the first and third rows of the OFM are of the plurality of rows of the OFM; and storing the plurality of rows of the OFM in the memory.

Example 8 is an apparatus, comprising: memory; and a hardware accelerator coupled to the memory, the hardware accelerator comprising logic configured to: receive, by a first buffer of the hardware accelerator, a first row of an input feature map (IFM) from the memory; receive, by a first group comprising a first plurality of tiles, a first row of the IFM from the first buffer, wherein each tile of the first group comprises a plurality of processing elements; compute, by the plurality of processing elements of the first plurality of tiles, at least a portion of a first row of an output feature map (OFM) based on the first row of the IFM and a kernel; receive, by a second buffer, a third row of the IFM from the memory; receive, by a second group comprising a plurality of tiles, the third row of the IFM from the second buffer, wherein each tile of the second group comprises a plurality of processing elements; and compute, by the plurality of processing elements of the second plurality of tiles, at least a portion of a third row of the OFM based on the third row of the IFM and the kernel, wherein the portions of the first and third rows of the OFM are computed by the hardware accelerator in parallel as part of a grouped convolution operation.

Example 9 includes the subject matter of example 8, the logic to compute the portion of the first row of the OFM to comprise logic to: perform a multiply-accumulate (MAC) operation on the first row of the IFM and the kernel in a first cycle; shift, in the first buffer, the first row of the IFM to produce a first shifted first row of the IFM; receive, by the first group, the first shifted first row of the IFM; perform the MAC operation on the first shifted first row of the IFM and the kernel in a second cycle; shift, in the first buffer, the first shifted first row of the IFM to produce a second shifted first row of the IFM; and perform the MAC operation on the second shifted first row of the IFM and the kernel in a third cycle.

Example 10 includes the subject matter of example 9, the logic to compute the portion of the third row of the OFM to comprise logic to: perform the MAC operation on the third row of the IFM and the kernel in the second cycle; shift, in the second buffer, the first row of the IFM to produce a first shifted third row of the IFM; receive, by the second group, the first shifted third row of the IFM; perform the MAC operation on the first shifted third row of the IFM and the kernel in the third cycle; shift, in the second buffer, the first shifted third row of the IFM to produce a second shifted third row of the IFM; and perform the MAC operation on the second shifted third row of the IFM and the kernel in a fourth cycle.

Example 11 includes the subject matter of example 10, the hardware accelerator comprising logic configured to: receive, by the first buffer, a second row of the IFM from the memory; receive, by the second buffer, a fourth row of the IFM from the memory; compute at least a second portion of the first row of the OFM based at least in part on the second row of the IFM; and compute at least a portion of a fourth row of the OFM based at least in part on the fourth row of the IFM, wherein the second portion of the first OFM and the portion of the fourth row of the OFM are computed by the hardware accelerator in parallel.

Example 12 includes the subject matter of example 8, the hardware accelerator comprising logic configured to: determine a size of the kernel or a stride size of the kernel specified in one or more configuration registers; generate the first group and the second group based at least in part on the size of the kernel or the stride size of the kernel; and organize the tiles of the first group and the second group into a compute grid based at least in part on the size of the kernel or the stride size of the kernel.

Example 13 includes the subject matter of example 8, wherein the hardware accelerator comprises logic for a convolutional neural network, wherein the hardware accelerator is configured to perform grouped convolution operations using the convolutional neural network.

Example 14 includes the subject matter of example 8, the hardware accelerator comprising logic configured to: compute each of a plurality of rows of the OFM, wherein the first and third rows of the OFM are of the plurality of rows of the OFM; and store the plurality of rows of the OFM in the memory.

Example 15 includes a non-transitory computer-readable storage medium storing instructions which when executed by a hardware accelerator cause the hardware accelerator to: receive, by a first buffer of the hardware accelerator, a first row of an input feature map (IFM) from a memory; receive, by a first group comprising a first plurality of tiles, a first row of the IFM from the first buffer, wherein each tile of the first group comprises a plurality of processing elements; compute, by the plurality of processing elements of the first plurality of tiles, a first row of an output feature map (OFM) based on the first row of the IFM and a kernel; receive, by a second buffer, a third row of the IFM from the memory; receive, by a second group comprising a plurality of tiles, the third row of the IFM from the second buffer, wherein each tile of the second group comprises a plurality of processing elements; and compute, by the plurality of processing elements of the second plurality of tiles, at least a portion of the third row of the OFM based on the third row of the IFM and the kernel, wherein the portions of the first and third rows of the OFM are computed by the hardware accelerator in parallel as part of a grouped convolution operation.

Example 16 includes the subject matter of example 15, the instructions to compute the portion of the first row of the OFM to comprise instructions to: perform a multiply-accumulate (MAC) operation on the first row of the IFM and the kernel in a first cycle; shift, in the first buffer, the first row of the IFM to produce a first shifted first row of the IFM; receive, by the first group, the first shifted first row of the IFM; perform the MAC operation on the first shifted first row of the IFM and the kernel in a second cycle; shift, in the first buffer, the first shifted first row of the IFM to produce a second shifted first row of the IFM; and perform the MAC operation on the second shifted first row of the IFM and the kernel in a third cycle.

Example 17 includes the subject matter of example 16, the instructions to compute the portion of the third row of the OFM to comprise instructions to: perform the MAC operation on the third row of the IFM and the kernel in the second cycle; shift, in the second buffer, the first row of the IFM to produce a first shifted third row of the IFM; receive, by the second group, the first shifted third row of the IFM; perform the MAC operation on the first shifted third row of the IFM and the kernel in the third cycle; shift, in the second buffer, the first shifted third row of the IFM to produce a second shifted third row of the IFM; and perform the MAC operation on the second shifted third row of the IFM and the kernel in a fourth cycle.

Example 18 includes the subject matter of example 17, further comprising instructions which when executed by the hardware accelerator cause the hardware accelerator to:

receive, by the first buffer, a second row of the IFM from the memory; receive, by the second buffer, a fourth row of the IFM from the memory; compute at least a second portion of the first row of the OFM based at least in part on the second row of the IFM; and compute at least a portion of a fourth row of the OFM based at least in part on the fourth row of the IFM, wherein the second portion of the first OFM and the portion of the fourth row of the OFM are computed by the hardware accelerator in parallel.

Example 19 includes the subject matter of example 15, further comprising instructions which when executed by the hardware accelerator cause the hardware accelerator to: determine a size of the kernel or a stride size of the kernel specified in one or more configuration registers; generate the first group and the second group based at least in part on the size of the kernel or the stride size of the kernel; and organize the tiles of the first group and the second group into a compute grid based at least in part on the size of the kernel or the stride size of the kernel.

Example 20 includes the subject matter of example 15, further comprising instructions for a convolutional neural network, wherein the hardware accelerator is configured to perform grouped convolution operations using the instructions for convolutional neural network.

Example 21 includes the subject matter of example 15, further comprising instructions which when executed by the hardware accelerator cause the hardware accelerator to: compute each of a plurality of rows of the OFM, wherein the first and third rows of the OFM are of the plurality of rows of the OFM; and store the plurality of rows of the OFM in the memory.

Example 22 is an apparatus, comprising: means for receiving, by a first buffer of a hardware accelerator, a first row of an input feature map (IFM) from a memory; means for receiving, by a first group comprising a first plurality of tiles, a first row of the IFM from the first buffer, wherein each tile of the first group comprises a plurality of processing elements; means for computing, by the plurality of processing elements of the first plurality of tiles, a first row of an output feature map (OFM) based on the first row of the IFM and a kernel; means for receiving, by a second buffer, a third row of the IFM from the memory; means for receiving, by a second group comprising a plurality of tiles, the third row of the IFM from the second buffer, wherein each tile of the second group comprises a plurality of processing elements; and means for computing, by the plurality of processing elements of the second plurality of tiles, at least a portion of the third row of the OFM based on the third row of the IFM and the kernel, wherein the portions of the first and third rows of the OFM are computed by the hardware accelerator in parallel as part of a grouped convolution operation.

Example 23 includes the subject matter of example 22, wherein the means for computing the portion of the first row of the OFM comprise: means for performing a multiply-accumulate (MAC) operation on the first row of the IFM and the kernel in a first cycle; means for shifting, in the first buffer, the first row of the IFM to produce a first shifted first row of the IFM; means for receiving, by the first group, the first shifted first row of the IFM; means for performing the MAC operation on the first shifted first row of the IFM and the kernel in a second cycle; means for shifting, in the first buffer, the first shifted first row of the IFM to produce a second shifted first row of the IFM; and means for performing the MAC operation on the second shifted first row of the IFM and the kernel in a third cycle.

Example 24 includes the subject matter of example 23, wherein the means for computing the portion of the third row of the OFM comprise: means for performing the MAC operation on the third row of the IFM and the kernel in the second cycle; means for shifting, in the second buffer, the first row of the IFM to produce a first shifted third row of the IFM; means for receiving, by the second group, the first shifted third row of the IFM; means for performing the MAC operation on the first shifted third row of the IFM and the kernel in the third cycle; means for shifting, in the second buffer, the first shifted third row of the IFM to produce a second shifted third row of the IFM; and means for performing the MAC operation on the second shifted third row of the IFM and the kernel in a fourth cycle.

Example 25 includes the subject matter of example 24, further comprising: means for receiving, by the first buffer, a second row of the IFM from the memory; means for receiving, by the second buffer, a fourth row of the IFM from the memory; means for computing at least a second portion of the first row of the OFM based at least in part on the second row of the IFM; and means for computing at least a portion of a fourth row of the OFM based at least in part on the fourth row of the IFM, wherein the second portion of the first OFM and the portion of the fourth row of the OFM are computed by the hardware accelerator in parallel.

Example 26 includes the subject matter of example 22, further comprising: means for determining a size of the kernel or a stride size of the kernel specified in one or more configuration registers; means for generating the first group and the second group based at least in part on a size of the kernel or a stride size of the kernel; and means for organizing the tiles of the first group and the second group into a compute grid based at least in part on the size of the kernel or the stride size of the kernel.

Example 27 includes the subject matter of example 22, wherein the hardware accelerator comprises means for a convolutional neural network, wherein the hardware accelerator is configured to perform grouped convolution operations using the convolutional neural network.

Example 28 includes the subject matter of example 22, further comprising: means for computing each of a plurality of rows of the OFM, wherein the first and third rows of the OFM are of the plurality of rows of the OFM; and means for storing the plurality of rows of the OFM in the memory.

In addition, in the foregoing, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A method, comprising:
  receiving, by a first buffer of a hardware accelerator, a first row of an input feature map (IFM) from a memory;
  receiving, by a first group comprising a first plurality of tiles, a first row of the IFM from the first buffer, wherein each tile of the first group comprises a plurality of processing elements;
  computing, by the plurality of processing elements of the first plurality of tiles, at least a portion of a first row of an output feature map (OFM) based on the first row of the IFM and a kernel;
  receiving, by a second buffer, a third row of the IFM from the memory;
  receiving, by a second group comprising a plurality of tiles, the third row of the IFM from the second buffer, wherein each tile of the second group comprises a plurality of processing elements; and
  computing, by the plurality of processing elements of the second plurality of tiles, at least a portion of a third row of the OFM based on the third row of the IFM and the kernel, wherein the portions of the first and third rows of the OFM are computed by the hardware accelerator in parallel as part of a grouped convolution operation.

2. The method of claim 1, wherein computing the portion of the first row of the OFM comprises:
  performing a multiply-accumulate (MAC) operation on the first row of the IFM and the kernel in a first cycle;
  shifting, in the first buffer, the first row of the IFM to produce a first shifted first row of the IFM;
  receiving, by the first group, the first shifted first row of the IFM;
  performing the MAC operation on the first shifted first row of the IFM and the kernel in a second cycle;
  shifting, in the first buffer, the first shifted first row of the IFM to produce a second shifted first row of the IFM; and
  performing the MAC operation on the second shifted first row of the IFM and the kernel in a third cycle.

3. The method of claim 2, wherein computing the portion of the third row of the OFM comprises:
  performing the MAC operation on the third row of the IFM and the kernel in the second cycle;
  shifting, in the second buffer, the first row of the IFM to produce a first shifted third row of the IFM;
  receiving, by the second group, the first shifted third row of the IFM;
  performing the MAC operation on the first shifted third row of the IFM and the kernel in the third cycle;

shifting, in the second buffer, the first shifted third row of the IFM to produce a second shifted third row of the IFM; and performing the MAC operation on the second shifted third row of the IFM and the kernel in a fourth cycle.

4. The method of claim 3, further comprising:

receiving, by the first buffer, a second row of the IFM from the memory;

receiving, by the second buffer, a fourth row of the IFM from the memory;

computing at least a second portion of the first row of the OFM based at least in part on the second row of the IFM; and computing at least a portion of a fourth row of the OFM based at least in part on the fourth row of the IFM, wherein the second portion of the first OFM and the portion of the fourth row of the OFM are computed by the hardware accelerator in parallel.

5. The method of claim 1, further comprising:

determining a size of the kernel or a stride size of the kernel specified in one or more configuration registers;

generating the first group and the second group based at least in part on the size of the kernel or the stride size of the kernel; and organizing the tiles of the first group and the second group into a compute grid based at least in part on the size of the kernel or the stride size of the kernel.

6. The method of claim 1, wherein the hardware accelerator comprises logic for a convolutional neural network, wherein the hardware accelerator is configured to perform grouped convolution operations using the convolutional neural network.

7. The method of claim 1, further comprising:

computing each of a plurality of rows of the OFM, wherein the first and third rows of the OFM are of the plurality of rows of the OFM; and storing the plurality of rows of the OFM in the memory.

8. An apparatus, comprising:

memory; and a hardware accelerator coupled to the memory, the hardware accelerator comprising logic configured to:

receive, by a first buffer of the hardware accelerator, a first row of an input feature map (IFM) from the memory;

receive, by a first group comprising a first plurality of tiles, a first row of the IFM from the first buffer, wherein each tile of the first group comprises a plurality of processing elements;

compute, by the plurality of processing elements of the first plurality of tiles, at least a portion of a first row of an output feature map (OFM) based on the first row of the IFM and a kernel;

receive, by a second buffer, a third row of the IFM from the memory;

receive, by a second group comprising a plurality of tiles, the third row of the IFM from the second buffer, wherein each tile of the second group comprises a plurality of processing elements; and compute, by the plurality of processing elements of the second plurality of tiles, at least a portion of a third row of the OFM based on the third row of the IFM and the kernel, wherein the portions of the first and third rows of the OFM are computed by the hardware accelerator in parallel as part of a grouped convolution operation.

9. The apparatus of claim 8, the logic to compute the portion of the first row of the OFM to comprise logic to:

perform a multiply-accumulate (MAC) operation on the first row of the IFM and the kernel in a first cycle;

shift, in the first buffer, the first row of the IFM to produce a first shifted first row of the IFM;

receive, by the first group, the first shifted first row of the IFM;

perform the MAC operation on the first shifted first row of the IFM and the kernel in a second cycle;

shift, in the first buffer, the first shifted first row of the IFM to produce a second shifted first row of the IFM; and perform the MAC operation on the second shifted first row of the IFM and the kernel in a third cycle.

10. The apparatus of claim 9, the logic to compute the portion of the third row of the OFM to comprise logic to:

perform the MAC operation on the third row of the IFM and the kernel in the second cycle;

shift, in the second buffer, the first row of the IFM to produce a first shifted third row of the IFM;

receive, by the second group, the first shifted third row of the IFM;

perform the MAC operation on the first shifted third row of the IFM and the kernel in the third cycle;

shift, in the second buffer, the first shifted third row of the IFM to produce a second shifted third row of the IFM; and perform the MAC operation on the second shifted third row of the IFM and the kernel in a fourth cycle.

11. The apparatus of claim 10, the hardware accelerator comprising logic configured to:

receive, by the first buffer, a second row of the IFM from the memory;

receive, by the second buffer, a fourth row of the IFM from the memory;

compute at least a second portion of the first row of the OFM based at least in part on the second row of the IFM; and compute at least a portion of a fourth row of the OFM based at least in part on the fourth row of the IFM, wherein the second portion of the first OFM and the portion of the fourth row of the OFM are computed by the hardware accelerator in parallel.

12. The apparatus of claim 8, the hardware accelerator comprising logic configured to:

determine a size of the kernel or a stride size of the kernel specified in one or more configuration registers;

generate the first group and the second group based at least in part on the size of the kernel or the stride size of the kernel; and organize the tiles of the first group and the second group into a compute grid based at least in part on the size of the kernel or the stride size of the kernel.

13. The apparatus of claim 8, wherein the hardware accelerator comprises logic for a convolutional neural network, wherein the hardware accelerator is configured to perform grouped convolution operations using the convolutional neural network.

14. The apparatus of claim 8, the hardware accelerator comprising logic configured to:

compute each of a plurality of rows of the OFM, wherein the first and third rows of the OFM are of the plurality of rows of the OFM; and store the plurality of rows of the OFM in the memory.

15. A non-transitory computer-readable storage medium storing instructions which when executed by a hardware accelerator cause the hardware accelerator to:

receive, by a first buffer of the hardware accelerator, a first row of an input feature map (IFM) from a memory;

receive, by a first group comprising a first plurality of tiles, a first row of the IFM from the first buffer, wherein each tile of the first group comprises a plurality of processing elements;

compute, by the plurality of processing elements of the first plurality of tiles, at least a portion of a first row of an output feature map (OFM) based on the first row of the IFM and a kernel;

receive, by a second buffer, a third row of the IFM from the memory;

receive, by a second group comprising a plurality of tiles, the third row of the IFM from the second buffer, wherein each tile of the second group comprises a plurality of processing elements; and compute, by the plurality of processing elements of the second plurality of tiles, at least a portion of a third row of the OFM based on the third row of the IFM and the kernel, wherein the portions of the first and third rows of the OFM are computed by the hardware accelerator in parallel as part of a grouped convolution operation.

16. The computer-readable storage medium of claim 15, the instructions to compute the portion of the first row of the OFM to comprise instructions to:

perform a multiply-accumulate (MAC) operation on the first row of the IFM and the kernel in a first cycle;

shift, in the first buffer, the first row of the IFM to produce a first shifted first row of the IFM;

receive, by the first group, the first shifted first row of the IFM;

perform the MAC operation on the first shifted first row of the IFM and the kernel in a second cycle;

shift, in the first buffer, the first shifted first row of the IFM to produce a second shifted first row of the IFM; and perform the MAC operation on the second shifted first row of the IFM and the kernel in a third cycle.

17. The computer-readable storage medium of claim 16, the instructions to compute the portion of the third row of the OFM to comprise instructions to:

perform the MAC operation on the third row of the IFM and the kernel in the second cycle;

shift, in the second buffer, the first row of the IFM to produce a first shifted third row of the IFM;

receive, by the second group, the first shifted third row of the IFM;

perform the MAC operation on the first shifted third row of the IFM and the kernel in the third cycle;

shift, in the second buffer, the first shifted third row of the IFM to produce a second shifted third row of the IFM; and perform the MAC operation on the second shifted third row of the IFM and the kernel in a fourth cycle.

18. The computer-readable storage medium of claim 17, further comprising instructions which when executed by the hardware accelerator cause the hardware accelerator to:

receive, by the first buffer, a second row of the IFM from the memory;

receive, by the second buffer, a fourth row of the IFM from the memory;

compute at least a second portion of the first row of the OFM based at least in part on the second row of the IFM; and compute at least a portion of a fourth row of the OFM based at least in part on the fourth row of the IFM, wherein the second portion of the first OFM and the portion of the fourth row of the OFM are computed by the hardware accelerator in parallel.

19. The computer-readable storage medium of claim 15, further comprising instructions for a convolutional neural network, wherein the hardware accelerator is configured to perform grouped convolution operations using the instructions for convolutional neural network.

20. The computer-readable storage medium of claim 15, further comprising instructions which when executed by the hardware accelerator cause the hardware accelerator to:

determine a size of the kernel or a stride size of the kernel specified in one or more configuration registers;

generate the first group and the second group based at least in part on the size of the kernel or the stride size of the kernel;

organize the tiles of the first group and the second group into a compute grid based at least in part on the size of the kernel or the stride size of the kernel;

compute each of a plurality of rows of the OFM, wherein the first and third rows of the OFM are of the plurality of rows of the OFM; and store the plurality of rows of the OFM in the memory.

* * * * *